(No Model.)

M. J. OWENS.
APPARATUS FOR MECHANICALLY OPERATING PASTE GLASS MOLDS.

No. 482,526. Patented Sept. 13, 1892.

WITNESSES
Carroll J. Webster
Grace E. Lehaney.

INVENTOR
Michael J. Owens
By William Webster
atty.

United States Patent Office.

MICHAEL J. OWENS, OF FINDLAY, OHIO.

APPARATUS FOR MECHANICALLY OPERATING PASTE-GLASS MOLDS.

SPECIFICATION forming part of Letters Patent No. 482,526, dated September 13, 1892.

Application filed December 18, 1891. Serial No. 415,476. (No model.)

*To all whom it may concern:*

Be it known that I, MICHAEL J. OWENS, of Findlay, county of Hancock, and State of Ohio, have invented certain new and useful Improvements in Apparatus for Mechanically Operating Paste-Glass Molds; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to an apparatus for mechanically operating paste-molds such as are used to mold fine glassware and which require wetting before each operation of molding.

It is a well-known fact that heretofore in operating paste-molds there has been an operative employed to open and close the molds and also to dip them in the water before every operation to wet the composition or paste to allow of revolving of the glass as it is being molded in the molds.

It is the object of this invention to lessen the expense in molding this class of work by opening and closing the molds and also dipping them into the water mechanically, thereby dispensing with the use of the operative employed in that capacity.

Another object is to save time in molding by forming a device and mechanism for opening and closing the molds by the blower, as it will be seen that the mold is always ready for use and can be opened and closed just when the condition of the glass is in an unblown or finished state.

Another object is to provide a tank or vessel and mechanism carrying the mold that shall be so counterbalanced that the mold shall be elevated above the tank, whereby when a light pressure is placed on the mold it will be depressed into the water, wetting the paste, and then rise when the pressure is withdrawn.

Having thus described the object of my invention, I will now proceed to describe the parts in detail, like numerals of reference indicating corresponding parts throughout the several views.

Figure 1:
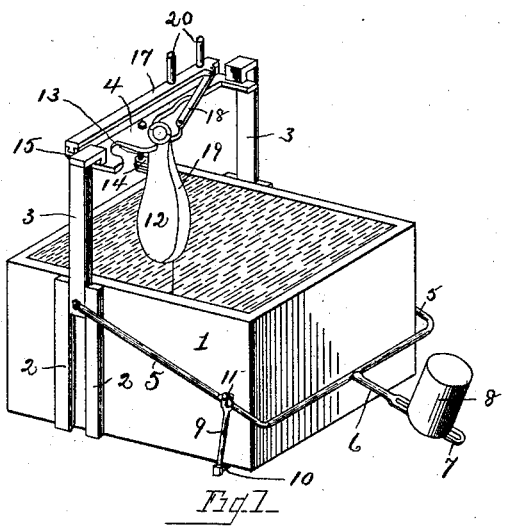
Figure 2:
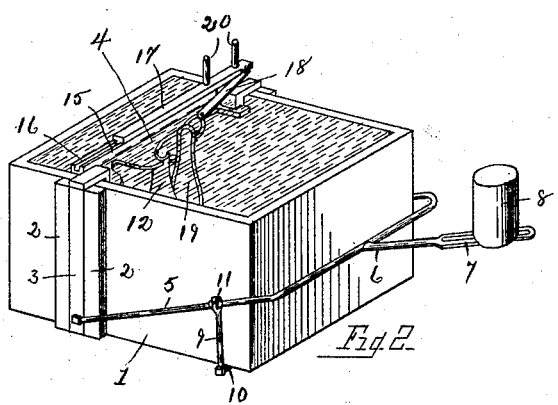
Figure 3:
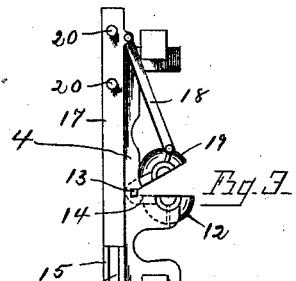
Figures 4, 5:
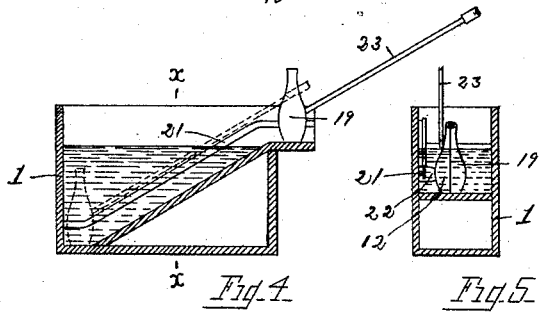
Figure 6:
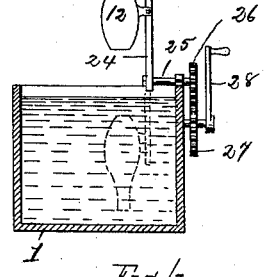

In the drawings, Figure 1 is a perspective view of the complete apparatus, the molds being in an elevated position. Fig. 2 is a like view, the molds being depressed into the tank. Fig. 3 is a top plan view of the cross-piece with the mold attached thereto, showing the mechanism employed to open and close the movable section. Fig. 4 is a sectional elevation of a modified form of mechanism for wetting the molds. Fig. 5 is a section on lines $x$ $x$, Fig. 4; and Fig. 6 is still another modification of the mechanism for wetting the molds.

1 designates the tank or chamber which is filled with water. This tank, being of any size or shape, needs no further description, and to the sides of the tank are secured the dovetailed grooved guides 2, in which slide vertically the posts 3, which carry on their upper ends a cross-piece 4, to which is secured one section of the mold, as will be described.

To the sliding posts 3 are pivotally secured the ends 5 of the bifurcated portion of the lever 6, the opposite end 7 of the lever carrying a weight 8, its side end being slotted to allow of adjustment of the weight, and lever 6 having a fulcrum on a link 9, pivotally secured to the rod 10 on the lower end and to the lever 6 at 11 on the upper ends. Thus it will be seen that the weight 8 is heavier than the mechanism connected to the ends 5 of the lever 6, thereby at all times keeping the ends 5 in a raised position.

To the cross-piece 4 is secured the immovable section 12 of the mold, preferably by being riveted to the cross-piece and by the bolt 13, passed through the cross-piece and hinge 14, on which the movable section turns. On the front side of the cross-piece is a raised portion 15, having a dovetailed groove 16 extending its entire length, in which moves laterally a section 17, having a dovetailed section, which slides in the dovetailed recess of the raised portion 15.

18 designates a link pivotally connected at one end to the section 17 and at the opposite end to the movable section of mold at 19.

20 designates upright posts secured to section 17, between which the foot of the blower is designed to rest, and then moved laterally either to open or close the movable section of mold to allow of insertion of the melted glass and removal of the same in a blown condition.

While I have shown one form of mold as diagrammatic of my invention, I wish it to be understood that in every form my mechanism and operation are applicable.

In operation the mold is in an elevated position, as shown in Fig. 1, when the blower inserts his foot between the upright posts 20, and, moving the same laterally, causes the link 18 to pull on the movable section, thereby opening the same. When the molten glass is inserted into the mold, the movement of the foot is reversed and the mold closed. The operation of blowing the glass is then performed, when he again opens the movable section, withdrawing the finished article. The cross-piece 4 is then given a slight downward pressure, causing the frame and mold to lower into the liquid in the tank or vessel 1, wetting the paste. The pressure is then removed and the mold will rise into operative position, owing to the weight 8, as has been described. By forming the weight adjustable as to the length of the lever 6 allows of adjusting the different sizes and consequently weight of molds.

In Fig. 4 I have shown a modified form of mechanism for wetting the mold. In this instance the mold rests upon an inclined plane leading into the liquid, having a guide 21 on the side of the tank or vessel, to which the mold is secured by means of section 22, secured to the immovable section of the mold, a lever 23 being employed to insert and withdraw the mold from the water between each operation of blowing, it being understood that the mechanism heretofore described for opening and closing the mold is employed.

In Fig. 6 is shown another modification in which the mold is secured to the crank 24, said crank being secured to the shaft 25, having on its outer end a cogged gear 26, meshing with another cogged gear 27, operated by the hand-lever 28, so that when the hand-lever is revolved the crank 24 is turned, passing the mold through the water, wetting the same. Thus it will be seen that I have formed a device for operating paste-molds mechanically, thus doing away with the operative usually employed to do this work. It will also be seen that I may form the tank to raise or lower and make the mold stationary as regards the tank, the main feature being to open and close the molds and immerse them in the water mechanically.

What I claim is—

1. In an apparatus for mechanically operating paste-molds to open, close, and cool the same, a tank containing a cooling liquid, a two-part mold, and mechanism for opening, closing, and immersing the molds.

2. In an apparatus for mechanically operating glass-paste molds, a tank filled with liquid, a movable frame, a section of mold connected therewith, and a section of mold pivotally connected with a lever pivoted to the frame, said frame being movable to immerse the molds in the liquid.

3. In an apparatus for mechanically operating paste-molds, a tank, a frame vertically movable in relation to the tank, carrying a sectional mold, and means connected thereto to open and close the mold mechanically, and a lever one end of which is pivoted to the frame and the other end carrying a weight to counterbalance the frame, so that the molds are raised above the tank.

In testimony that I claim the foregoing as my own I hereby affix my signature in presence of two witnesses.

MICHAEL J. OWENS.

Witnesses:
ELISHA B. SOUTHARD,
BYRON A. CASE.